(12) United States Patent
Kubicek et al.

(10) Patent No.: US 12,515,430 B2
(45) Date of Patent: Jan. 6, 2026

(54) KITCHEN TOOL FOR FORMING BAKING LINER

(71) Applicants: Keith R. Kubicek, Batesville, IN (US); Amelia K. Kubicek, Batesville, IN (US)

(72) Inventors: Keith R. Kubicek, Batesville, IN (US); Amelia K. Kubicek, Batesville, IN (US)

( * ) Notice: Subject to any disclaimer, the term of this patent is extended or adjusted under 35 U.S.C. 154(b) by 108 days.

(21) Appl. No.: 18/740,489

(22) Filed: Jun. 11, 2024

(65) Prior Publication Data

US 2024/0391200 A1    Nov. 28, 2024

Related U.S. Application Data

(63) Continuation-in-part of application No. 18/183,991, filed on Mar. 15, 2023, now Pat. No. 12,005,674.

(51) Int. Cl.
| | |
|---|---|
| *B30B 15/02* | (2006.01) |
| *A47J 43/00* | (2006.01) |
| *B21D 37/10* | (2006.01) |
| *B30B 9/28* | (2006.01) |
| *B31D 5/02* | (2017.01) |

(52) U.S. Cl.
CPC ......... *B30B 15/02* (2013.01); *A47J 43/00* (2013.01); *B21D 37/10* (2013.01); *B30B 9/28* (2013.01); *B31D 5/02* (2013.01)

(58) Field of Classification Search
CPC . B30B 15/02; B30B 9/28; A47J 43/00; B21D 37/10; B31D 5/02; B31D 5/04
USPC .................. 425/398, 403; 249/170
See application file for complete search history.

(56) References Cited

U.S. PATENT DOCUMENTS

| | | | | |
|---|---|---|---|---|
| 1,716,554 | A * | 6/1929 | Hoff, Jr. ............... | B31B 70/00 493/158 |
| 3,007,377 | A * | 11/1961 | Muller ................ | B31B 50/44 47/72 |
| 3,550,421 | A * | 12/1970 | Stakel ................ | A21B 3/132 493/167 |
| 5,073,161 | A * | 12/1991 | Weder ................ | B65D 85/52 493/167 |

FOREIGN PATENT DOCUMENTS

KR    20220014975 A  *  2/2022

OTHER PUBLICATIONS

English translation of KR-20220014975-A by EPO. (Year: 2022).*

* cited by examiner

Primary Examiner — Xiao S Zhao
Assistant Examiner — Inja Song

(57) ABSTRACT

A simple multi-piece manually operated kitchen tool intended for use in a home or small kitchen wherein this tool is used to form baking liner material into a formed baking liner having flat bottom and fluted sidewalls. The perimeter of the kitchen tool may be designed to form a traditional circular liner as for cupcakes or alternately a rectangle or some other geometric or non-geometric shape such as semi-circle, rectangle, ellipse, star, crescent, sun, heart, etc.

5 Claims, 16 Drawing Sheets

KITCHEN TOOL FOR FORMING BAKING LINER

This invention is a simple tool which relates generally to food preparation and presentation in a home or small kitchen. It comprises a simple tool which is used to form kitchen baking liner material into a shape having approximately flat bottom with fluted sidewalls. The formed perimeter shape could be traditional circular, or rectangular, or a star, or a heart, or an ellipse, etc. The resultant formed liner would be used in place of retail purchased pre-formed baking liners.

BACKGROUND OF THE INVENTION

Conventional baking of individual serving baked goods such as cupcakes or muffins typically uses retail purchased, single use, fluted paper liners with circular perimeter. Retail baking liners were first produced in the early 1900's and are currently produced in factories using high volume production machinery. These factories have for a long time used a method to form liners in a machine generally described thus-placing baking liner material between forming tools consisting of a rigid hollow part with flutes on the interior and a second rigid part with flutes on the exterior. A machine presses the part with flutes on the exterior into the hollow part with flutes on the interior with the baking liner therebetween which forms the liner to have a flat bottom and fluted sidewalls. For a consumer, there is currently no kitchen tool they might purchase if they wish to form their own fluted liners. So, they must purchase retail packages of factory formed baking liners which are widely available at retail stores. The purchaser of these liners chooses from the limited color and printed pattern options available on the store shelf. Custom-printed retail liners may be specially ordered, but at additional cost. Almost all available retail baking liners are traditional circular or, less often, square perimeter. These retail liners are inexpensive, although a drawback is that baked goods tend to stick to the retail liners, particularly in gluten free baking.

In addition to single serving baking cups, bakers sometimes use baking liners when making a cake or larger baked item. They may just cut a shape to fit the bottom of their pan, or they use liner material larger than the pan and the weight of the batter pushes the liner material to the bottom of the pan and conforms the liner material to the sidewalls of the pan. The sidewalls in this instance likely experience excess liner which results in inconsistent, random overlapping of the liner material.

As an option to purchased baking liners, home bakers may alternately use a suitable size drinking cup and manually form liner material around it. Bakers use the drinking cup as a 'mold'. This manual forming has somewhat inconsistent results and portions of the vertical walls overlap which partially or wholly distort or hide desired images pre-printed on the vertical sides of the liner. In this method, dimensions of the formed liner may be too large or too small depending upon the user's available drinking cup size.

One additional option for home bakers is to purchase reusable silicone baking liners. These are more of an individual baking pan, generally not requiring the use of an actual cupcake pan. The problem with these silicone liners is that the baker must retrieve their silicone baking liners which can be difficult when used at a function outside the baker's home.

SUMMARY OF THE INVENTION

The unique invention herein improves the food preparation experience by providing a simple, lightweight, manually operated kitchen tool which the home baker may use to consistently form fluted baking liners out of the user's choice of baking liner material, (i.e., baking parchment paper, Quilon liner, wax paper, aluminum foil, etc.). This invention would be used to form kitchen baking liner material into a shape with approximately flat bottom and fluted sidewalls. In addition to traditional circular perimeter baking cups, embodiments of this invention may be constructed wherein the perimeter of the kitchen tool is a non-circular shape such as diamond or rectangle or star or heart or some other fun or geometric or non-geometric shape. This invention also provides the user with the option to customize the liner material or individually pre-color or decorate the liner material prior to forming.

The method of forming baking liner between rigid, fluted upper and lower tool pieces has over time become public domain. The invention herein is inclusive of the described physical hand tool for use in home kitchens. This invention has two embodiments where the method of use embodies a flexible or hinged tool feature. All embodiments of this baking liner forming tool herein are included in this same specification as they all produce the same result-they are all used to manually form baking liner material.

BRIEF DESCRIPTION OF THE DRAWINGS

The drawings accompanying and forming part of this specification are included to depict aspects of the invention and are not deemed to be all-inclusive. A person versed in the art may design a similar tool which appears different yet performs this same function. Embodiments illustrated in the drawings refer to the exemplary, and therefore nonlimiting, where like numerals are used to refer to like. The features illustrated in the drawings are not necessarily drawn to scale.

It is noted that the unformed liner material represented in the drawings is illustrated as circular or rectangular, but that is entirely the discretion of the user. They may decide to cut a circular shape or fanciful shape or simply tear the liner to approximate size.

FIG. 15 also shows a representation of the finally formed liner material.

INVENTION DESCRIPTION AND OPERATION

This invention specification describes five embodiments. The formed liner resulting from each embodiment of the invention is similar, although there will be minor variations in resulting formed liner dependent upon which embodiment is used in forming the liner material. The resultant baking liner has roughly flat bottom and fluted sidewalls. It may have a circular perimeter or some other perimeter such as, but not limited to rectangular, elliptical, star shape, heart shape, etc. The invention may be scaled in size larger or smaller depending upon the desired size of the finished liner. In addition, for a given size tool of this invention, the user may vary the liner's sidewall height by using larger or smaller pieces of baking liner material.

Prior art in the public domain is the method of making cupcake liners through forming baking liner material between some fashion of rigid, fluted upper and lower tools or apparatus. This same method of use is used by home bakers forming baking liner between two drinking cups. The new art defined in this specification is the physical kitchen tool which uses this same method of operation from the public domain.

It is noted that the two kitchen tool embodiments which use flexible or hinged apparatus are using new art for the method of use and also new art for the physical kitchen tool.

Overview of the embodiments of the invention presented herein:

1. Two-piece tool with single operation; top forming tool and bottom forming tool.
   1a Two-piece tool similar to 1. wherein the diameter is larger to form a liner for a pan or dish.
2. Two-piece tool, but the upper pusher tool is used one way to preform the liner, then inverted to push the liner material into the bottom tool resulting in the final formed liner material.
3. Three-piece tool with bottom tool, a preform tool and a push-thru tool.
4. Two-piece tool wherein the top pusher tool is flexible or hinged and initially wider to partially form the liner material. During use, the pusher is pushed into the rigid bottom tool, which causes the pusher to flex inward to become smaller diameter while forming the final shape of the liner material.
5. Three-piece tool where the bottom tool piece forming the outside perimeter of the liner material is flexible or hinged and it flexes inward, forming the liner material against the rigid pusher tool forming the inside profile of the liner material.

DETAILED TOOL OPERATION AND DESCRIPTION

Images representative of described forming methods generally illustrate traditional circular profile of the liner material, but in all these embodiments, the baking liner material may be formed to a non-circular perimeter profile such as a rectangle, oval or ellipse, heart, star, etc.

Figure 1:
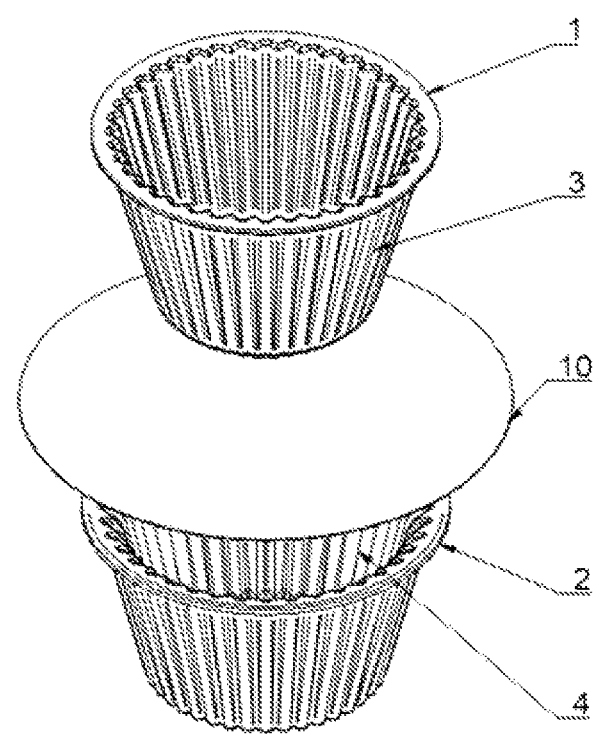
FIG. 1 illustrates a two-piece embodiment of this invention showing top tool, bottom tool and a representation of baking liner material in position to begin forming. The view shows a tool which forms a baking liner similar to a traditional circular perimeter. Inclusive in this embodiment is that it may be designed to an alternate perimeter profile such as rectangle, heart, ellipse, etc.

1. Two-piece tool with single operation represented in FIG. 1 & FIG. 2. In this embodiment of the invention, there are two parts of the forming tool. A top tool 1 and bottom tool 2. FIG. 1 shows representative baking liner material 10 roughly positioned on the bottom tool 2 prior to forming.

Describing the physical tool in this embodiment, the outside perimeter of the top tool 1 is in the form of a truncated cone with vertical ribs 3 spaced around the outside perimeter as illustrated in FIG. 1. The bottom tool 2 is similarly a truncated cone, with forming ribs 4 on the inside perimeter. The interface between the ribs 3 and 4 is designed to flex the liner material to form and retain the desired final profile. It is noted that specific tool surface profiles and dimensions of both the top tool 1 and bottom tool 2 are determined either by mathematical analysis or trial and error or some combination thereof.

Employing this embodiment to form baking liner material, the user employs hand pressure to push the top tool 1 against the unformed liner material 10 as illustrated in FIG. 1. The user pushes the top tool 1 fully into the bottom tool 2 while positioning the baking liner between the two. Compressing the top tool 1 into the bottom tool 2 compresses the liner material 10 between the ribs 3 and 4 on the two tools. This forces the liner to conform to the ribs 3 and 4. The user then uses fingers to remove the top tool 1 out of the bottom tool 2. The user subsequently uses their fingers to remove the formed liner material 30. This formed baking liner 30 is then placed into a cupcake or muffin baking pan and filled with the desired material for baking.

Figure 2:
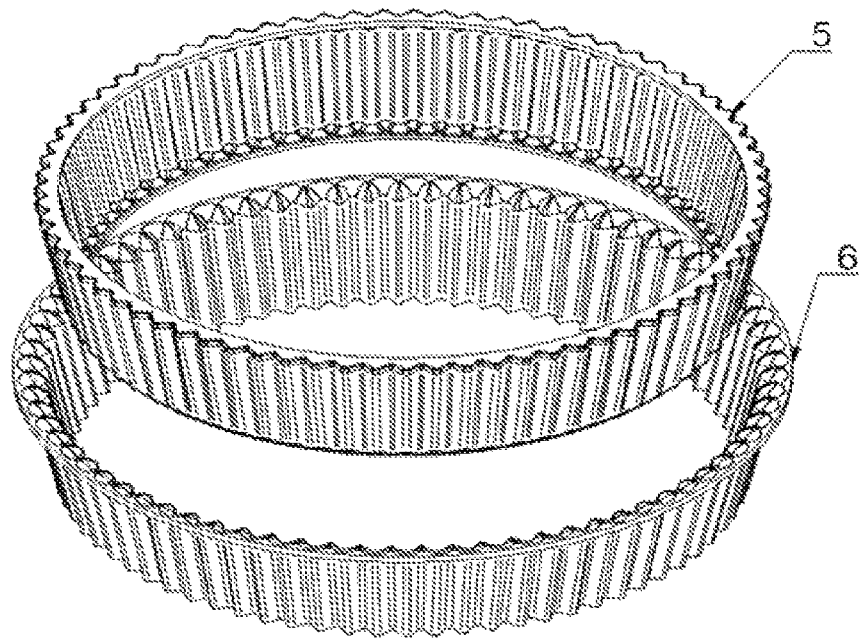
FIG. 2 is an illustration of a two-piece embodiment similar to that in FIG. 1, however FIG. 2 embodies a larger diameter which forms liner material as for a circular baking pan or pie pan. Inclusive in this embodiment is that it may be designed to an alternate perimeter profile such as rectangle, heart, ellipse, etc.

1a. Exemplary scaled version of two-piece tool represented in FIG. 2 illustrates said two-piece tool comprising a top tool 5 and bottom tool 6. This embodiment has physical description as above for two-piece tool and is not repeated here. This embodiment is scaled to a larger diameter to form a liner for a circular baking pan or pie pan or as a liner for a dish of some sort. This scaled liner forming tool would be sized to form the liner material to appropriate diameter and wall height for the desired pan or dish. This tool may alternatively be designed to a rectangle or other shape befitting the desired receptacle. Using the tool is the same as described in 1. above for a similar two-piece tool.

Figure 3:
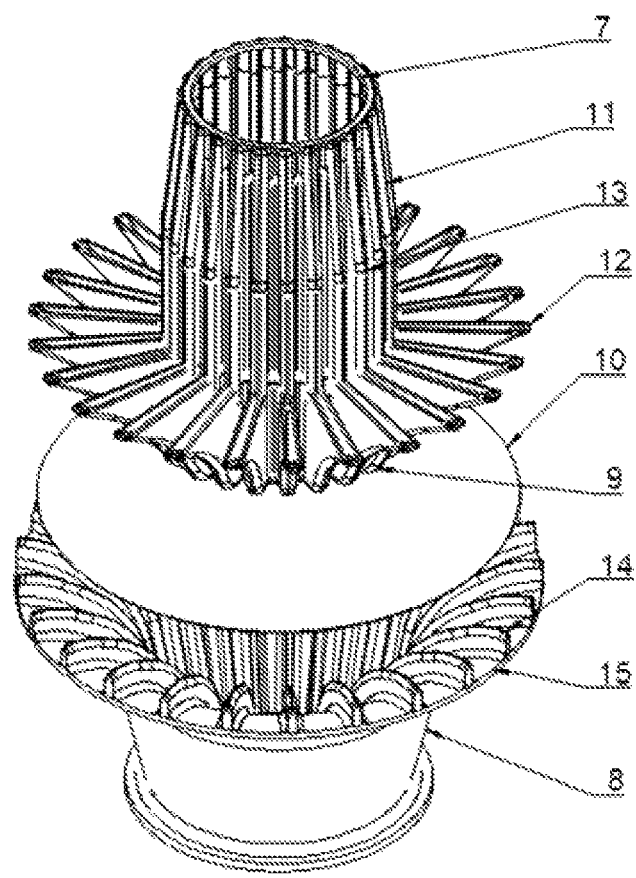
FIG. 3 is an illustration of a different embodiment of a two-piece tool wherein the top tool has a side A, and a side B. Side A is used to initially preform the liner material and side B is used to push the liner material into the bottom tool where together they form the liner material into the final shape. As with other embodiments of this invention, it may be designed to an alternate perimeter profile such as rectangle, heart, semi-circle, star, ellipse, sun, etc.
Figure 4:
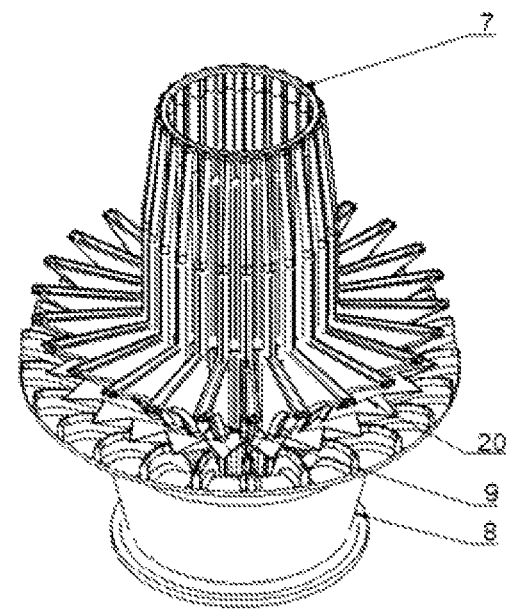
FIG. 4 is an illustration of the embodiment in FIG. 3 using top tool side A to begin forming flutes or 'preform' the liner material.

2. Two-piece tool with one piece of the tool used to perform two operations illustrated in FIG. 3, FIG. 4 and FIG. 5. In this embodiment of the tool the top tool 7 has two functional sides, radially wide flared side A 9 and narrowly flared side B 11. FIG. 3 is representative of this embodiment of the invention with the unformed baking liner material 10 centered on top of the bottom tool 8 prior to forming.

Describing the physical tool comprising this embodiment, the top tool 7 is roughly a truncated cone with a side A 9 and side B 11. Each side has vertical ribs 12 & 13 around the outside profile. The ribs 12 on side A 9 are at a radially wide angle suitable for initial preforming of the liner material 10 against the ribs 14 of the bottom tool 8. Side B 11 of the top tool 7 similarly has raised ribs 13, however they are at a longitudinally much steeper angle for properly forming the final profile of the liner material 30 against the ribs 14 of the bottom tool 8. The bottom tool 8 is a hollow funnel shape and has vertical raised ribs 14 (or raised surfaces) on the inside perimeter. These ribs 14 on the bottom tool 8 interface with the top tool 7 to form the final profile of the liner material 30. FIG. 3 shows representative raised ribs 14 on the inside diameter of the bottom tool 8. There are many other potential profiles for the 'valley' area 15 between ribs 14 of the tool 8. Many valley 15 shapes of the tools could be used to properly form the liner material, as long as the top, forming surface of the ribs 14 (or raised surfaces) properly engages the liner material while interfacing with the top tool 7. To form the desired final profile of the liner material 30, specific tool surface profiles and dimensions of the tool pieces are determined either by mathematical analysis or trial and error or some combination thereof.

To use this tool resulting with the formed baking liner material 30, the user centers the unformed liner material 10 on bottom tool 8. Then user takes the top tool 7 and approximately centers side A 9 on the liner material 10 which is resting on the bottom tool 8. The user presses with hand force on top tool 7 side A 9 against the liner material 10 on top the bottom tool 8. This serves to preform the liner material 20. The user may need to wiggle or slightly rotate top tool 7 side A 9 approximately +/−5 degrees to get top tool 7 side A 9 to make a preform of the baking liner material 20. Representation illustrated in FIG. 4.

Figure 5:
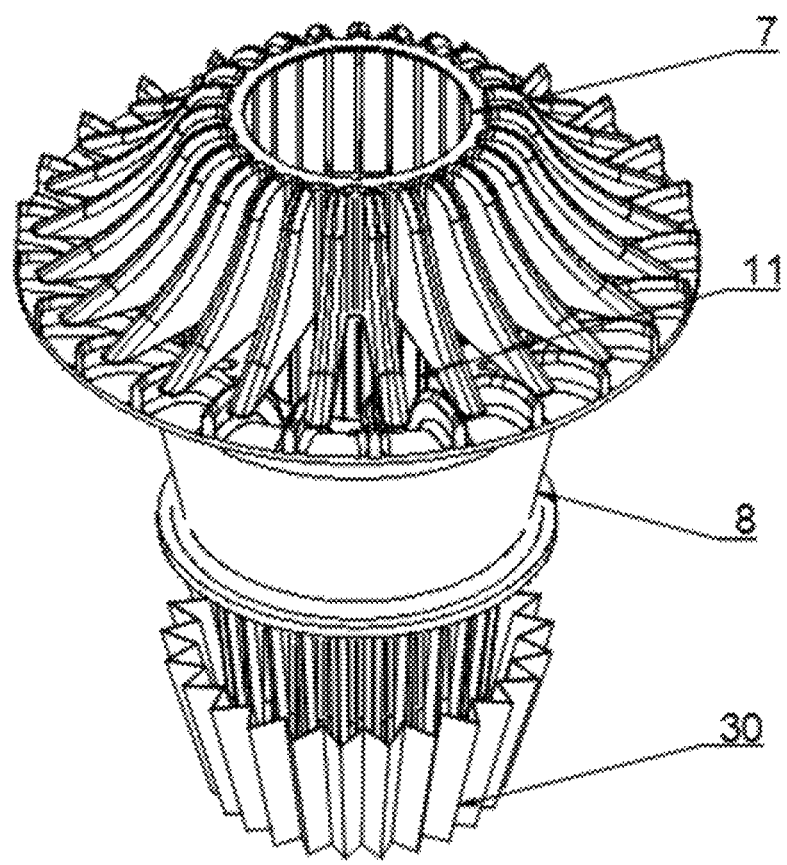
FIG. 5 is an illustration of the final stage of forming the liner material using the embodiment in FIG. 3 and FIG. 4.

The user then keeps the preformed liner material 20 in preformed position on the bottom tool 8 while lifting and inverting the top tool 7 to side B 11. The user then places top tool 7 side B 11 against the preformed liner material 20. The user approximately aligns ribs 13 of the top tool 7 side B 11 with the indented, preformed liner material 20. The user presses the top tool 7 side B 11 against the preformed liner material 20, then pushing it into the bottom tool 8. As the top tool 7 side B 11 is pressed into the bottom tool 8, the ribs 12 and valleys of the top tool 7 will tend to self-align with the ribs and valleys on the bottom tool 8 for proper final forming of the liner material 30. Dependent upon the way the tool is designed to operate, the user may need to continue pushing the top tool 7 side B 11 into the bottom tool 8, eventually lifting the whole assembly from the flat surface. In this use case, the user would continue pressing the top tool 7 side B 11 through the bottom tool 8 until the final formed liner material 30 comes out the bottom of the whole assembly. This is represented in FIG. 5.

Figure 6:
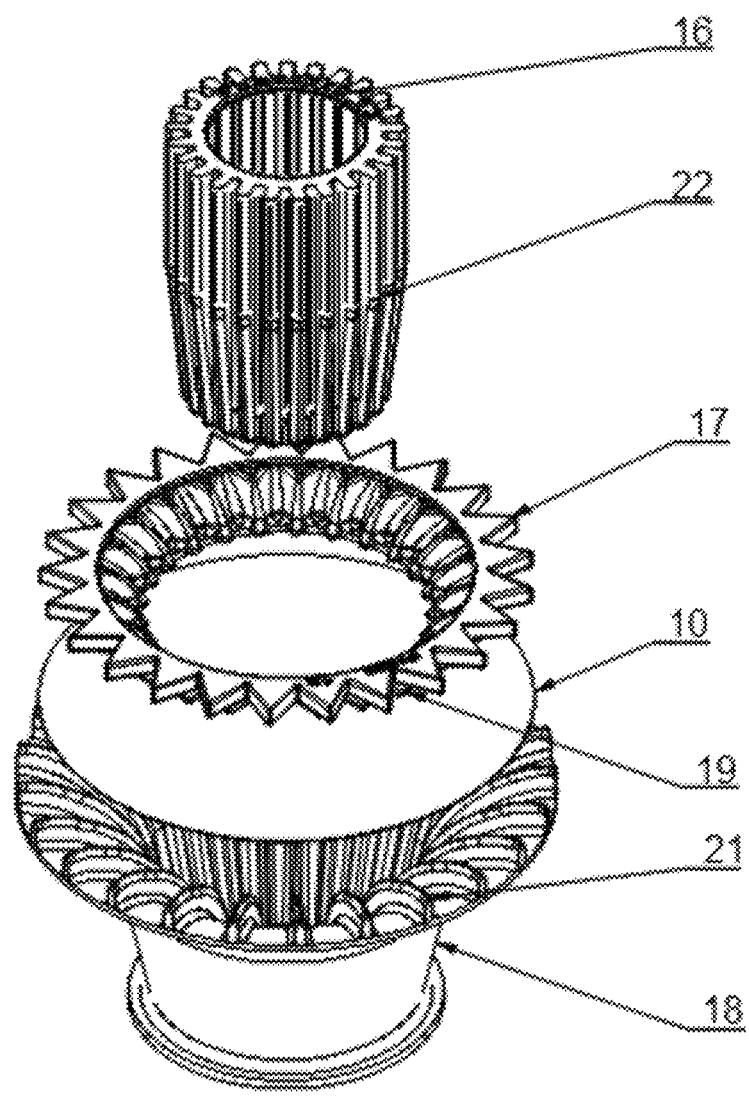
FIG. 6 is an illustration of a three-piece embodiment of this invention. As with the other embodiments, it may be designed to an alternate perimeter profile such as rectangle, heart, ellipse, etc.

3. Three-piece tool represented in FIG. 6, FIG. 7, FIG. 8, and FIG. 9. In this embodiment of the invention, there are three separate pieces comprising the tool. The preform tool 17, the bottom tool 18 and the pusher tool 16. FIG. 6 shows a representative exploded view of the three pieces of this embodiment with unformed liner 10.

Describing the physical tool in this embodiment, the preform tool 17 is a hollow, truncated cone shape with radial ribs 19 around the underside perimeter of the tool 17. These ribs 19 are sized and spaced to correspond with the forming ribs 21 on the bottom tool 18. The ribs on the preform tool 17 are angled downward from horizontal so as to conform to the lead-in on the ribs 21 of the bottom tool 18. Material on the preform tool 17 between these ribs 19 is removed so as to allow the flutes of the preformed liner material 20 to flex upward during preform and subsequent forming operation. The top tool 16 is the approximate shape of a truncated cone or cylinder having vertical ribs 22 around the outer circumference which align between the ribs 21 on the bottom tool 18 and also align to the inside diameter of the preform tool 17. The bottom tool 18 is a hollow funnel shape and has raised ribs 21 conforming to the preform tool 17 and top tool 16 which form the liner material 10. The specific profiles of the ribs 22, 19, and 21 are determined through mathematical analysis or by trial and error or through some combination thereof.

Figure 7:
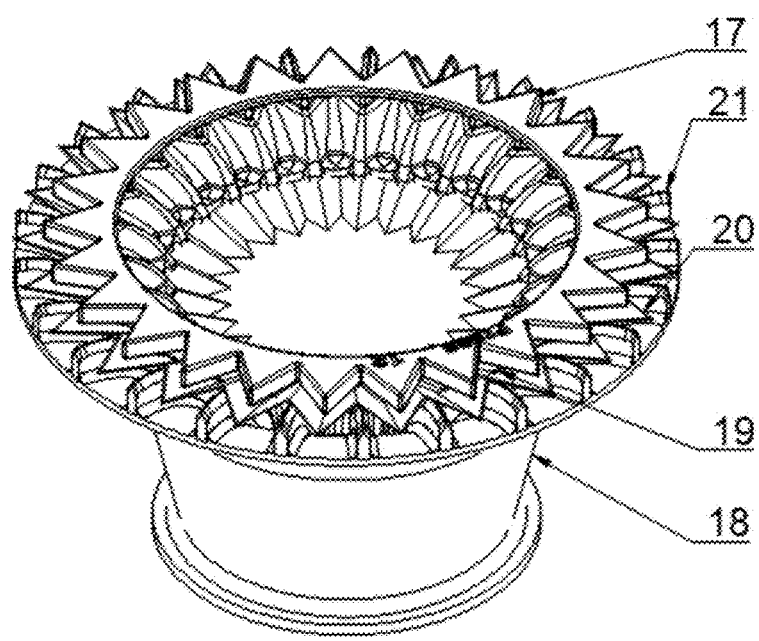
FIG. 7 is an illustration of the embodiment of FIG. 6. This view shows the first step in forming, the press tool is being used to preform the liner material.

To use this embodiment of the invention to form the liner material, the user places the bottom tool 21 on a flat surface with the desired un-formed liner material 10 centered on top. The user next places the preform tool 17 approximately centered on top of the liner material 10 which is resting on the bottom tool 18. The user presses downward on the preform tool 17 to start forming the liner. The user may need to wiggle or rotate pre-form tool 17 +/−5 to 10 degrees while simultaneously pressing downward to get the preform tool 17 to make the preform of the liner material 20. By design, the preform tool 17 will self-orient to the raised ribs on the bottom tool 13. A representation of this is shown in FIG. 7.

Figure 8:
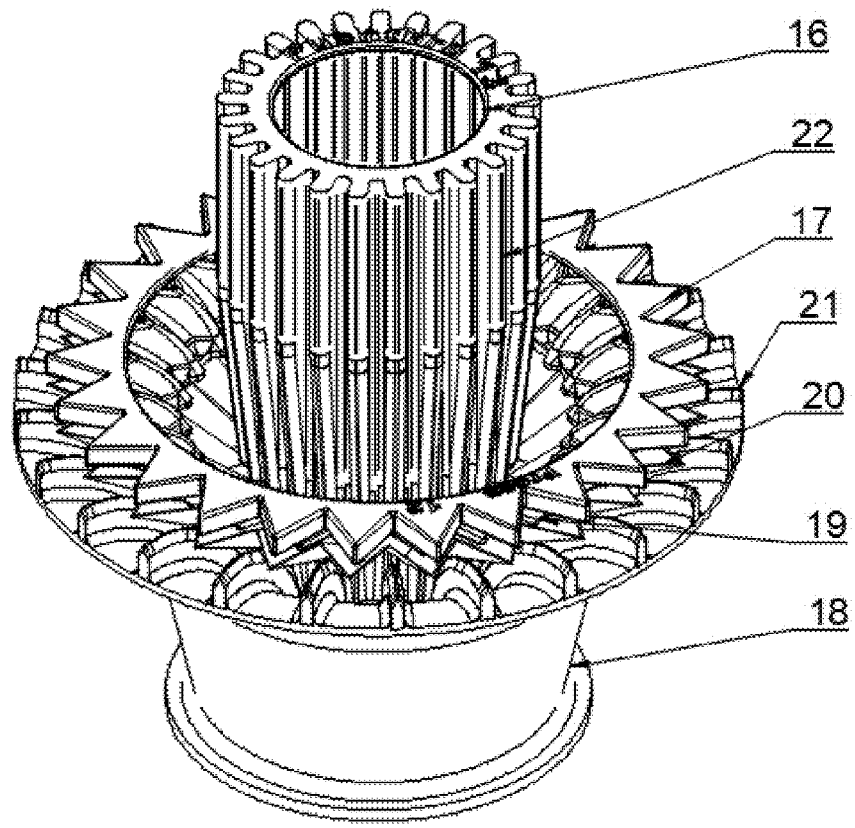
FIG. 8 is an illustration of the embodiment of FIG. 6, and FIG. 7. This view shows the next step in forming the liner material. The top tool is in position to begin pushing liner material through the preform tool and into the bottom tool.

The user continues holding the preform tool 17 in place on the bottom tool 18 along with the now preformed liner 20. The user keeps the preform tool 17 in place and then places the pusher tool 16 in the center of the preformed liner material 20. The pusher tool 16 will align to the inside perimeter of the preform tool 17. At this point in the process, both preform tool 17 and preformed liner material 20 are resting on the bottom tool 18. The user pushes downward on the pusher tool 16, continuing with a retaining downward force on the preform tool 17. As the pusher tool 16 presses the preformed liner material 20 into the bottom tool 18, the ribs on the pusher tool 16 will self-orient to the inside diameter of the preform tool 17 and also to the ribs on the bottom tool 18. This is represented in FIG. 8. The interfacing ribs of the pusher tool 16 and the bottom tool 18 act to conform form the pliable liner material to the desired shape.

Figure 9:
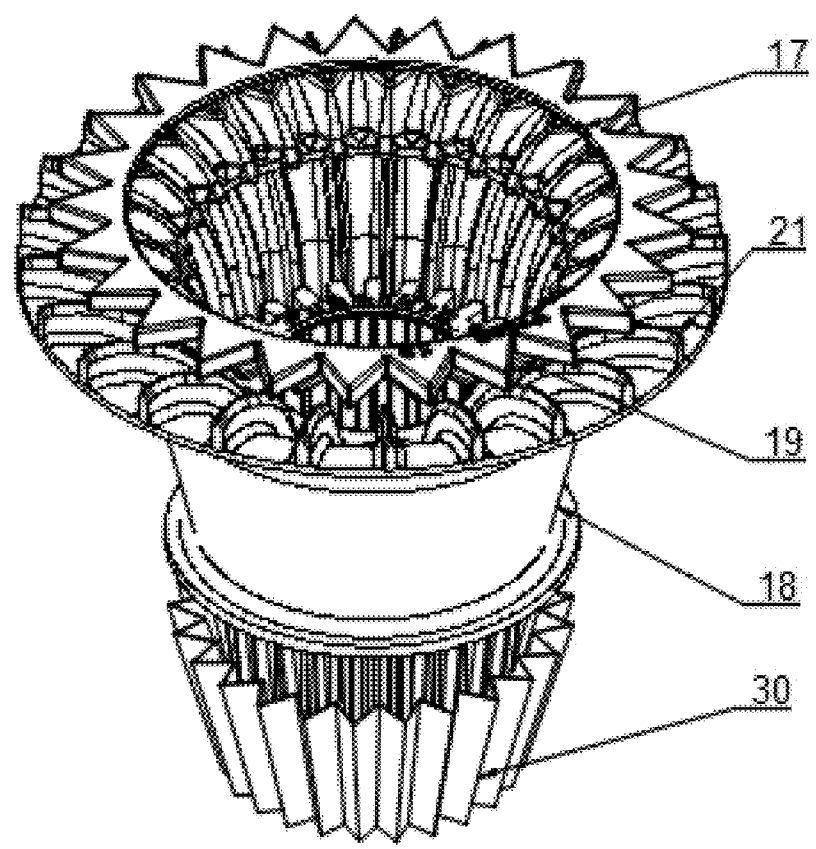
FIG. 9 is an illustration of the embodiment of FIG. 6, FIG. 7 and FIG. 8. However, this view illustrates the use case where the formed liner is pushed out the bottom of the tool assembly.

Depending upon the design of this embodiment, once the pusher tool 16 is pressed downward until it touches the flat surface, The user may need to lift the whole assembly while continuing to push the pusher tool 16 through the bottom tool 18 until the formed liner 30 is pushed out the bottom of the assembly. This is represented in FIG. 9.

4. Flexible pusher tool embodiment represented in FIG. 10, FIG. 11 and FIG. 12. This embodiment is presented with two possible options utilizing a flexible pusher tool 23 or 24 represented in FIG. 10. One with ribs 26 which flex inward and another with flutes 29 which are made with flexible sides or hinges 35 which enable the tool to flex. These are not presented as an inclusive list of possible embodiments of the embodiment. Both produce the same result which is formed baking liner material.

Figure 10:
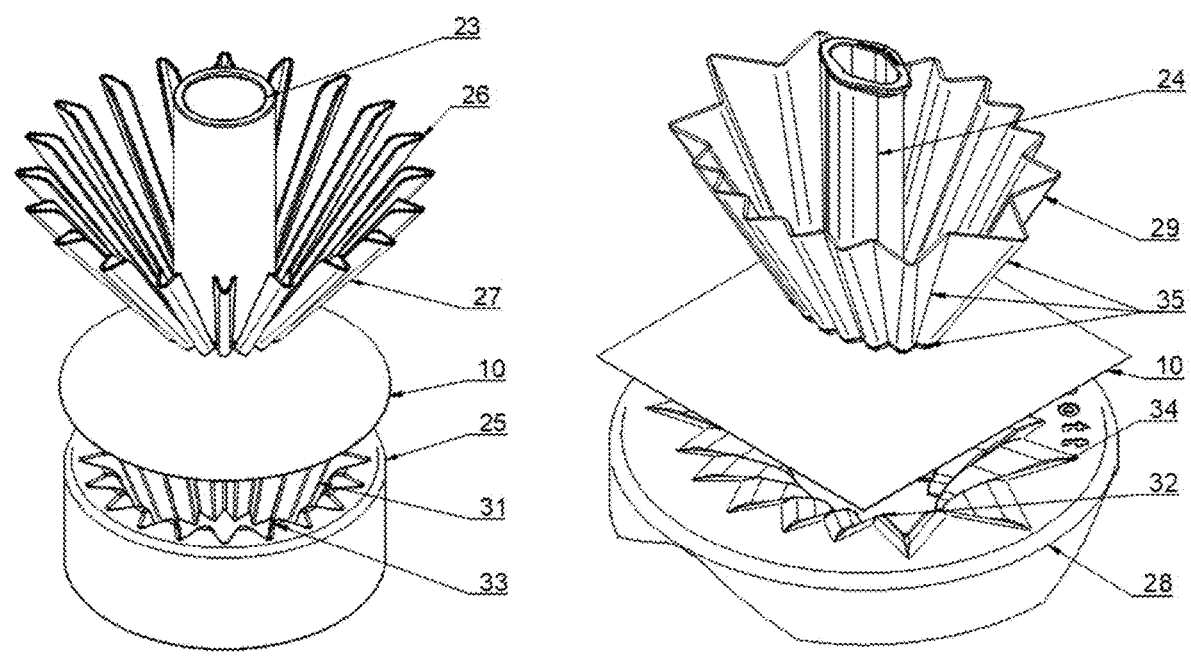
FIG. 10 is an illustration of isometric assembly views representative of two interpretations of the same flexible or hinged embodiment. As with the other embodiments, it may be designed to an alternate perimeter profile such as rectangle, heart, ellipse, etc.

Describing the exemplary physical tool comprising this embodiment, the pusher tool 23 is a truncated cone with separated ribs 26 vertically around the outside perimeter. These ribs 26 have a flexible hinge 27 where each rib 26 connects to the middle part of the top tool 23. In the other option, the pusher tool 24 is a slightly different design wherein the vertical ribs 29 are connected to each other and to the middle part of this top tool 24 by some sort of hinges 35. There are many possible configurations of each bottom tool 25 or 28. Representations of two possible configurations are illustrated in FIG. 10. The configuration of the bottom tools 25 or 28 are designed to properly interface with the top tools 23 or 24. This bottom tool 25 or 28 is constructed with vertical ribs 31 or 32 around the interior circumference. This bottom tool 25 or 28 is flared outward at the top 33 or 34 to facilitate proper lead-in for the liner material 10 during initial forming.

Figure 11:
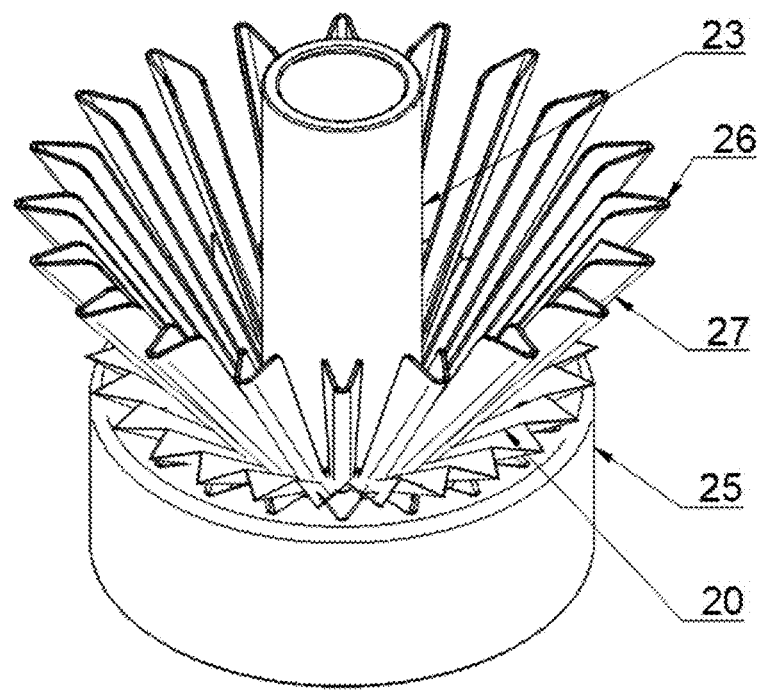
FIG. 11 is an illustration of one of the embodiments from FIG. 10 as it is used to begin to form liner material.
Figure 12:
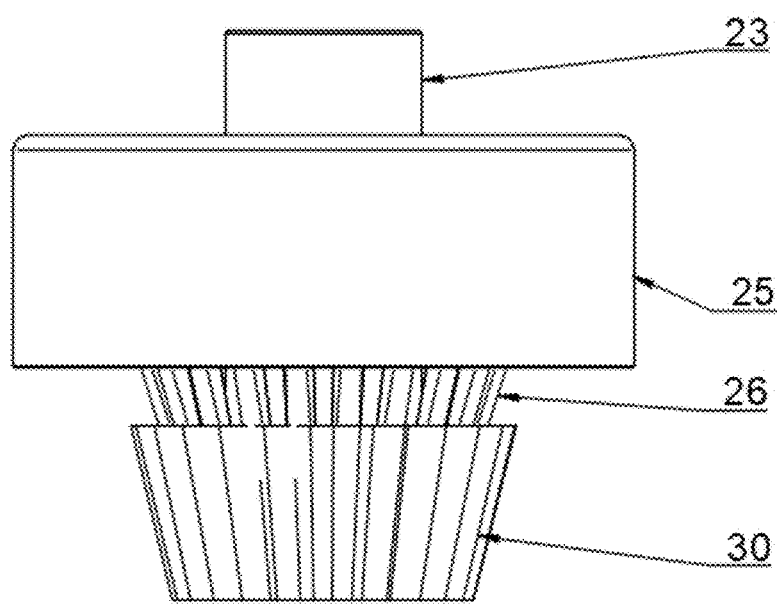
FIG. 12 is an illustration of the case where the formed liner is pushed out of the bottom of the embodiment of FIG. 11.

To use this embodiment, The user would place the bottom tool 25 or 28 on a flat surface. The user then places the baking liner material 10 approximately centered on top. The user then places the corresponding pusher tool 23 or 24 approximately centered on top of the liner material 10 which is resting on top of the bottom tool 25 or 28. The user then begins pushing the pusher tool 23 or 24 downward, into the liner material 10 and hence into the respective bottom tool 25 or 28. This will start forming the liner material 20 as represented in FIG. 11. As the pusher tool 23 or 24 is pushed further against the liner material 20 into the bottom tool 25 or 28, the pusher tool 23 or 24 flexes upward and inward forming a smaller radial diameter. As the pusher tool 23 or 24 is flexing to smaller diameter, it is aligning to the flutes in the bottom tool 23 or 24 beginning to form the liner material 20. This is represented in FIG. 11. Depending upon the specific design of the tool pieces, the liner may be completely formed when the pusher tool 23 or 24 reaches the flat surface, or the pusher tool 23 or 24 may need to push completely through the bottom tool 25 or 28. Represented in FIG. 12 is the case where the pusher tool 23 or 24 pushes completely through the bottom tool 25 or 28.

The tool represented here might also be designed using some type of spring arrangement to apply outward force to the ribs 26 or 29. (Spring arrangement not illustrated in this specification).

Figure 13:
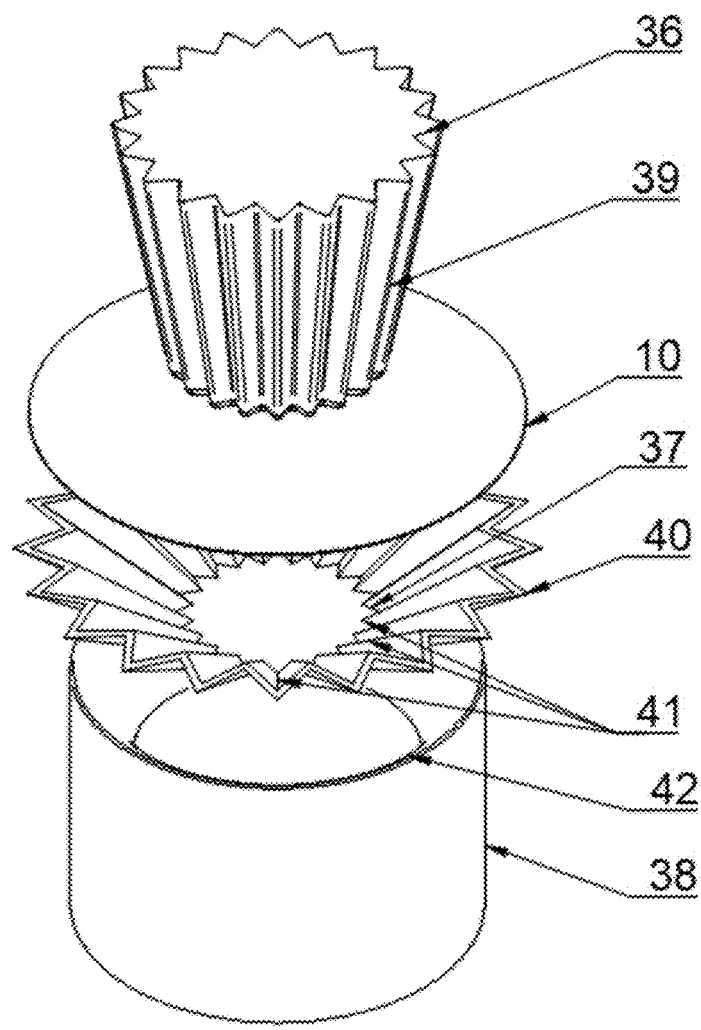
FIG. 13 is an illustration of another embodiment of the invention. In this embodiment, the tool piece forming the outside of the liner material flexes upward and inward as it forms the liner material. In this embodiment, the tool forming the inside surface of the liner material is rigid. (Similar to FIG. 10 except FIG. 13 illustrates the condition where the flexible portion is forming the outside surface of the liner).

5. Flexible middle tool embodiment represented in FIG. 13, FIG. 14 and FIG. 15. This embodiment comprises three pieces. A rigid top tool 36, a flexible middle tool 37 and a base 38. Unique in this embodiment is that the flexible middle tool 37 forms the outside perimeter of the liner material 10 through the action of the exterior ribs 40 flexing upward and inward through the action of pressing the flexible middle tool 37 into the base 38.

Describing the physical pieces comprising this embodiment, the top tool 36 is a truncated cone having vertical ribs 39 around the exterior perimeter. The flexible middle tool 37 is a truncated cone with ribs 40 around the inside perimeter. The ribs 40 in the flexible middle tool 37 may be pointed as shown in the representative figures or rounded or another profile which properly flexes to form the liner material 10. The flexible middle tool 37 has thin sidewalls or some other configuration to allow the flexible ribs 40 to move inward and upward as they form the liner material 10. The flexible middle tool 37 ribs 40 comprise hinged seams 41 which flex or bend. This allows the ribs 40 to have relative motion during tool use. The base 38 is a hollow cylinder comprising a chamfer or radius or some combination which forms the top inside perimeter. In use, the interior, curved top of the base 38 acts against the outside of the ribs 40 of the flexible middle tool 37, compressing the ribs 40 which interface with the ribs 39 on the top tool 36 to form the final shape of the liner material 30.

Figure 14:
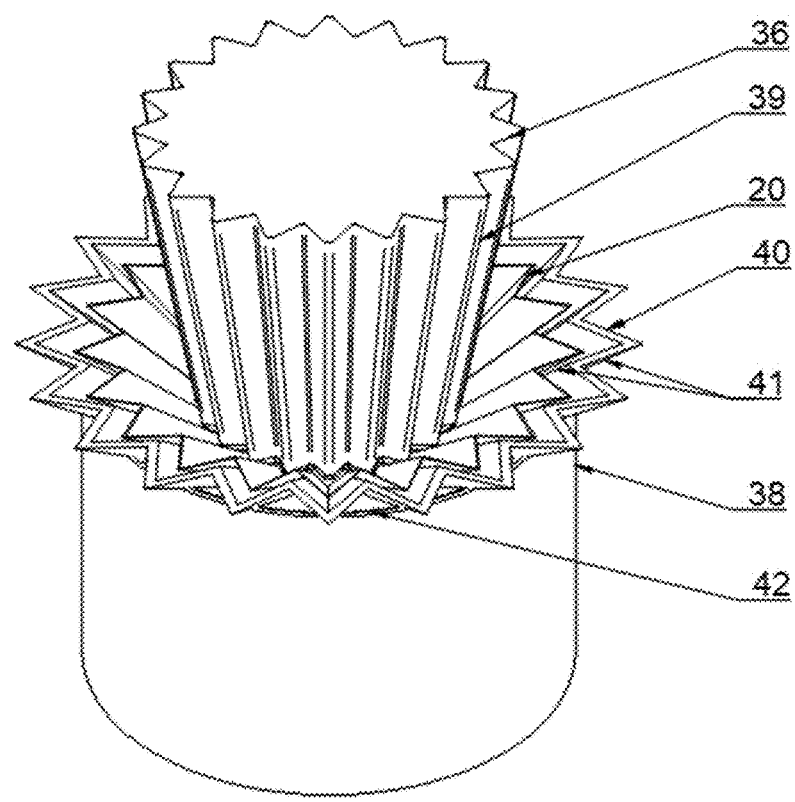
FIG. 14 illustrates using the tool in FIG. 13 wherein forming is starting and the tool piece forming the outside of the liner is beginning to flex inward and upward.
Figure 15:
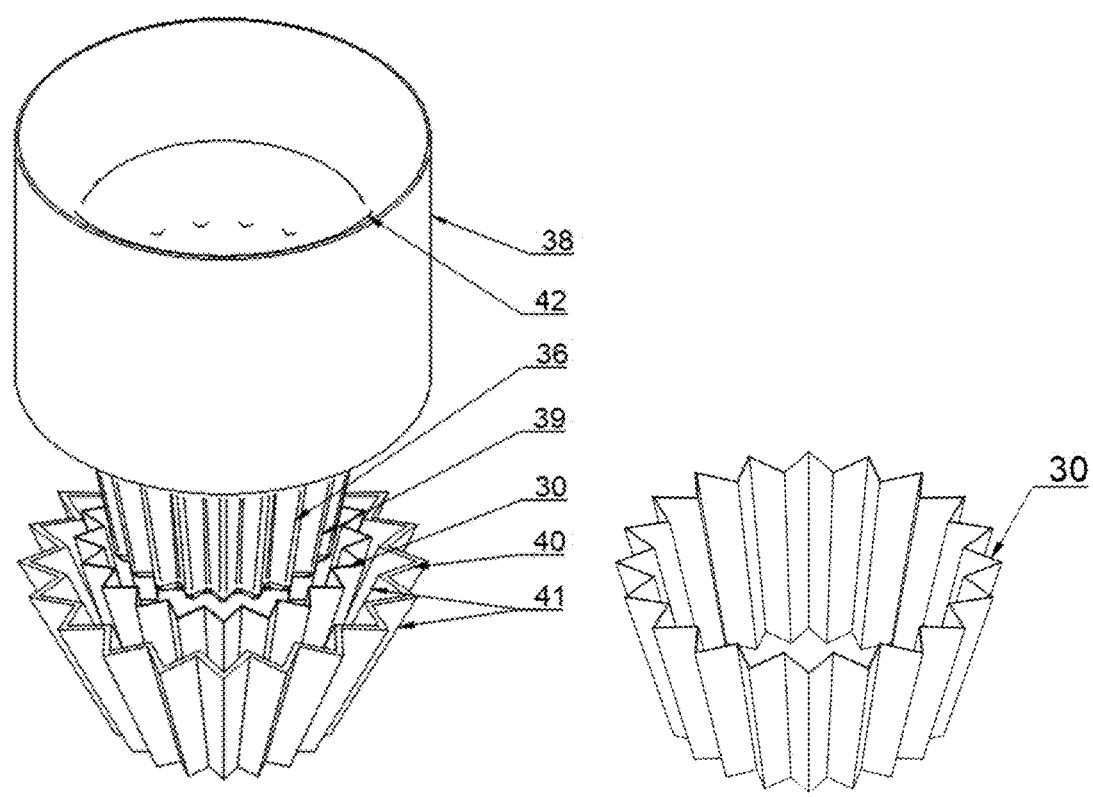
FIG. 15 illustrates the tool in FIG. 13 and FIG. 14 wherein the tool forming the inside of the liner is pressed completely.
Figure 16:
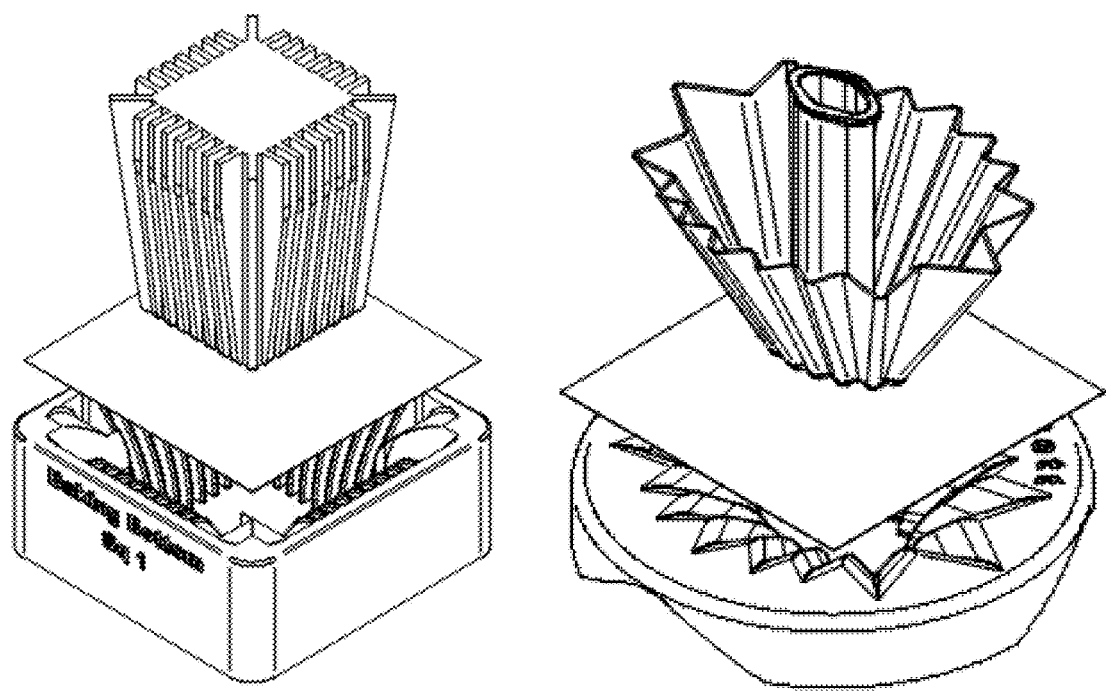
FIG. 16 illustrates representations of two proposed embodiments of geometries for tools which form perimeters other than circular. The tool represented on the left is indicative of a tool forming a rectangular liner and the tool on the right is indicative of a tool forming an elliptical perimeter liner. There are other possible perimeter profiles, so these are not a limiting representation of all possible forming tool shapes.

To use this embodiment of the invention the user places the base 38 on a flat surface. Next the user places the flexible middle tool 37 approximately centered on the base 38. Then the user places the unformed liner material 10 approximately centered on the flexible middle tool 37. The user then places the top tool 36 approximately centered on the liner material 10. This step is represented in FIG. 14. The user then starts pressing the top tool 36 into the liner material 10 and into the flexible middle tool 37. The flexible middle tool 37 and top tool 36 may have a feature to assist aligning the ribs 39 on the top tool 36 to the ribs 40 on the flexible middle tool 37. (Alignment feature not represented in the drawings). As the top tool 36 pushes against the liner material 10 and the flexible middle tool 37, the flexible middle tool 37 starts forming the liner material 20. As the top tool 36 interfaces with the flexible middle tool 37 and is pressed all the way into the base 38, the ribs 40 of the flexible middle tool will have flexed inward, thus forming the exterior of the liner material. Depending upon the tool designed for this embodiment, the liner may be complete at this point, or the top tool 36 may have to push the liner material 10 and flexible middle tool 37 completely through the base 38.

While particular embodiments and applications of this disclosure have been illustrated and described, it should be understood that the scope of this disclosure is not limited thereto. A person skilled in the art could make modifications without deviating from the scope of the present disclosure. One could make additions or subtractions such that these other embodiments of this same invention could be configured or operated differently than the illustrative examples presented herein. However, the result is the same as presented here, liner material 30 formed in the shape of a baking liner.

What is claimed is:

1. A kitchen tool comprising:
   a rigid bottom tool having a sidewall which includes inwardly facing ribs bounding a hollow interior of the bottom tool and further defining inter-rib valleys, the bottom tool having an upper portion, a lower portion, and an interior profile that tapers from wider at the top of the bottom tool to narrower at the bottom of the bottom tool, the upper portion of the bottom tool being a shallower sloped upper portion and the lower portion of the bottom tool being a steeper sloped lower portion extending downwardly from the shallower sloped upper portion; and
   a rigid top tool having a first side on one end and a second side on a distal end which is opposite the one end, wherein the first side has an exterior profile which is geometrically similar to the interior profile of at least the upper portion of the bottom tool and which includes outwardly facing ribs, and the second side includes a pusher tool which is geometrically similar to the interior profile of the lower portion of the bottom tool and which includes outwardly facing ribs, and wherein the first side is dimensioned so that the first side can be inserted into the bottom tool with the ribs of the first side nesting in the inter-rib valleys, the first side is also separable from the hollow interior of the bottom tool, and the pusher tool is dimensioned so that, upon inverting of the rigid top tool, the pusher tool can be inserted into the lower portion of the bottom tool with the ribs of the pusher tool nesting in the inter-rib valleys of the lower portion of the bottom tool; and wherein the top tool and the bottom tool is adapted to receive a liner therebetween when the top tool and the bottom tool are in a vertically separated state relative to each other and to deform the liner upon insertion of the top tool into the bottom tool.

2. The tool of claim 1 wherein deformation of the liner includes an initial deformation resulting from downward insertion of the first side of the top tool into the upper portion of the bottom tool and a second deformation resulting from subsequent downward insertion of the pusher tool into the lower portion of the bottom tool by the inverting the rigid top tool.

3. The kitchen tool of claim 1 wherein a lower extremity of the bottom tool bounds an opening and at least one of the bottom tool and the pusher tool is adapted to push the liner at least partially through the opening.

4. The kitchen tool of claim 3 wherein the shallower sloped upper portion is curved.

5. The kitchen tool of claim 3 wherein the slope of the shallower sloped upper portion varies along the vertical length of the shallower sloped upper portion.

\* \* \* \* \*